United States Patent
Jackson

(10) Patent No.: US 9,789,430 B2
(45) Date of Patent: Oct. 17, 2017

(54) CANISTER FILTER WITH PREFILTRATION

(71) Applicant: American Air Filter Company, Inc., Louisville, KY (US)

(72) Inventor: Paul Jackson, North Shields (GB)

(73) Assignee: American Air Filter Company, Inc., Louisville, KY (US)

( * ) Notice: Subject to any disclaimer, the term of this patent is extended or adjusted under 35 U.S.C. 154(b) by 24 days.

(21) Appl. No.: 14/465,949

(22) Filed: Aug. 22, 2014

(65) Prior Publication Data

US 2015/0052865 A1  Feb. 26, 2015

Related U.S. Application Data

(60) Provisional application No. 61/869,356, filed on Aug. 23, 2013.

(51) Int. Cl.
| | |
|---|---|
| *B01D 46/00* | (2006.01) |
| *B01D 46/52* | (2006.01) |
| *B01D 46/54* | (2006.01) |
| *B01D 46/24* | (2006.01) |

(52) U.S. Cl.
CPC ..... *B01D 46/0024* (2013.01); *B01D 46/2403* (2013.01); *B01D 46/2411* (2013.01); *B01D 46/521* (2013.01); *B01D 46/543* (2013.01); *B01D 2239/065* (2013.01); *B01D 2239/08* (2013.01); *B01D 2275/10* (2013.01)

(58) Field of Classification Search
CPC ............. B01D 46/24; B01D 46/2403; B01D 46/2411; B01D 46/2414; B01D 46/521; B01D 46/543; B01D 2239/065; B01D 2239/0654; B01D 2275/10; B01D 46/0024; B01D 2239/08
See application file for complete search history.

(56) References Cited

U.S. PATENT DOCUMENTS

| | | | | |
|---|---|---|---|---|
| 4,508,775 A | * | 4/1985 | Adiletta | A41D 31/0016 162/156 |
| 5,252,207 A | | 10/1993 | Miller et al. | |
| 5,415,676 A | | 5/1995 | Tokar et al. | |
| 5,552,048 A | * | 9/1996 | Miller | B01D 29/012 210/489 |
| 5,858,044 A | | 1/1999 | Nepsund | |

(Continued)

FOREIGN PATENT DOCUMENTS

| | | | | |
|---|---|---|---|---|
| JP | 3114079 | | 12/2000 | |
| JP | WO 2013031228 A1 | * | 3/2013 | ............. B01D 39/16 |

OTHER PUBLICATIONS

"Properties of DuPont Teflon Industrial Coatings", from the Donwell Company website, www.donwell.com/teflon, captured Mar. 17, 2010.*

(Continued)

*Primary Examiner* — Robert Clemente
(74) *Attorney, Agent, or Firm* — Middleton Reutlinger

(57) ABSTRACT

An integral canister filter having multiple layers, including a prefiltration layer. The prefiltration layer may filter oil and/or water from an airflow to protect downstream components. The prefiltration layer may be treated with a water and/or oil repelling or absorbing material. The second layer may be a porous membrane filter positioned downstream of the prefiltration layer. The third layer may provide structural support for the first and/or second layers.

27 Claims, 3 Drawing Sheets

(56) References Cited

U.S. PATENT DOCUMENTS

| | | | |
|---|---|---|---|
| 5,935,284 A | 8/1999 | Tokar et al. | |
| 6,007,608 A | 12/1999 | Johnson | |
| 6,066,264 A * | 5/2000 | Ronan | B01D 17/00 210/167.31 |
| 6,422,396 B1 | 7/2002 | Li et al. | |
| 6,485,535 B1 | 11/2002 | Linnersten et al. | |
| 6,991,665 B1 | 1/2006 | Allen et al. | |
| 7,501,003 B2 | 3/2009 | Muller | |
| 8,017,011 B2 | 9/2011 | Ellis et al. | |
| 8,323,384 B2 | 12/2012 | Derstler et al. | |
| 2003/0010002 A1 | 1/2003 | Johnson et al. | |
| 2003/0132153 A1 | 7/2003 | Jelten | |
| 2004/0206682 A1 | 10/2004 | Hamlin et al. | |
| 2005/0132682 A1 * | 6/2005 | Paul | B01D 29/07 55/486 |
| 2005/0166757 A1 | 8/2005 | Brandl et al. | |
| 2007/0012624 A1 | 1/2007 | Bacino et al. | |
| 2008/0302074 A1 | 12/2008 | Gebert et al. | |
| 2008/0307971 A1 * | 12/2008 | Horie | B01D 39/1623 95/287 |
| 2009/0266048 A1 * | 10/2009 | Schwarz | B01D 39/1692 60/39.092 |
| 2011/0048228 A1 * | 3/2011 | Handley | B01D 46/0068 95/45 |
| 2012/0186452 A1 * | 7/2012 | Smithies | B01D 39/163 96/9 |
| 2013/0056428 A1 | 3/2013 | Levy | |
| 2014/0223872 A1 * | 8/2014 | Bao | B01D 39/16 55/486 |
| 2015/0113929 A1 * | 4/2015 | Jackson | B01D 46/0023 55/487 |
| 2015/0122127 A1 * | 5/2015 | Lans | B01D 46/543 95/273 |

OTHER PUBLICATIONS

Korean Intellectual Property Office; The International Search Report and the Written Opinion of the International Searching Authority, or the Declaration; International Search Report and Written Opinion for PCT/US2014/052347; dated Dec. 12, 2014; pp. 1-8, Korean Intellectual Property Office, Korea.

* cited by examiner

CANISTER FILTER WITH PREFILTRATION

CROSS-REFERENCE TO PRIOR APPLICATION

This nonprovisional application claims priority to and benefit under 35 U.S.C. 119(e) to U.S. Provisional Application No. 61/869,356, filed Aug. 23, 2013, which is incorporated by reference in its entirety.

TECHNICAL FIELD

Generally, a filter including a membrane is taught. More specifically, present embodiments relate to a prefilter and membrane filter integral with a canister or cartridge style filter.

BACKGROUND

Fine particles of salt, water, oil, and other chemical contaminants can be detrimental to canister filters. This contamination, in addition to standard dust and/or other particle loading, reduces life expectancy of canister filters. With higher efficiency filter canisters, loading can further reduce life expectancy and consequently increase operating costs. HEPA level filtration materials in canisters are among the most efficient materials available for canister filters and therefore typically display the shortest life expectancy due to loading and/or contamination.

Gas turbine filtration applications often utilize a filtration membrane layer, such as expanded polytetrafluoroethylene (ePTFE) or high molecular weight polyethylene (HMWPE), for high efficiency filter applications. An increase in the use of membrane filtration has come, at least in part, as a result of an increase in requests for filtration products capable of EPA and/or HEPA grade filtration efficiency. However, HEPA grade filtration may be difficult to achieve in some applications, such as those using marine gas turbines. This difficulty is at least partially due to the operating conditions that these filters are subjected to such as the amount and types of contaminants, as well as a requirement of minimal downtime. Further, industrial environments tend to reduce service life of gas turbine filters. This is generally due, at least in part, to face loading of membrane filtration materials caused by particulate, hydrocarbons, and moisture capture.

These issues have at times been combated in one of two ways. The first is to add a layer of prefiltration directly to the substrate. The second has been to utilize a filter wrap that can help pre-load and extend the life of the HEPA canister filter. These products typically focus only on particulate filtration. However, there are additional contaminants, which can reduce the service life of a filter, that existing prefilters do not address.

Thus, there is a need in the art for overcoming the issues of existing systems.

SUMMARY

The present disclosure is directed towards a canister filter with prefiltration for filtering a fluid flow. The canister filter with prefiltration is, in various embodiments, a multilayer media having at least three layers, including a first layer forming the outer surface or perimeter of the media, a second porous layer, and a third or support layer.

Generally, in one aspect, an integral canister filter is provided comprising a multilayer media having at least three layers. The three layers of the media form a hollow tube shape and are supported by a tube structure. The media is able to be positioned in an air flow and allow the air flow to pass through the at least three layers. The first layer is a pre-filtration layer that forms the outer circumference and an in-flow surface of the multilayer media. The first layer includes a material that is hydrophobic, hydrophilic, oleophobic, and/or oleophilic. The second layer is a porous membrane filtration layer that is downstream of the first layer and interposed between the first layer the third layer. The third layer is a structurally supportive layer that is downstream of the first layer and is pleatable or embossable, or both. Optionally, the filter may include an adhesive layer attaching the first layer to the second layer. The adhesive layer may include hot melt glue, spray adhesive, or both. The first layer may be formed of microglass fibers and/or the first material may be a binder for binding the microglass fibers. The micgroglass fibers may have a basis weight in the range of about 25 to 105 grams per square meter (gsm), and more specifically may be about 65 gsm. The first material of the first layer may be hydrophobic and oleophobic, hydrophobic and oleophilic, hydrophilic and oleophobic, or hydrophilic and oleophilic, and/or may be a fluorochemical. The first layer may have an efficiency of about 90% for removing normal atmospheric solid aerosol and particulate contaminants and/or may be approximately 10 to 1000 micrometers thick. The second layer may be formed of high molecular weight polyethylene (HMWPE), it may have pores with diameters of about 1 to 12 micrometers, and/or be about 10 to 400 micrometers thick. The third layer may be both pleatable and embossable. The tube structure may include two end caps that are axially aligned and oppositely disposed, separated by a mesh tube that is disposed across an interior surface of the multilayer media. There may also be a second mesh tube across the in-flow surface of the media.

Generally, in another aspect, an integral canister filter is provided comprising a multi-layer media forming a tube shape. The multi-layer media has at least three layers that are in fluid communication with each other to allow an airflow through the multi-layer media. The first layer forms an outer perimeter and an in-flow surface of the multi-layer media. The first layer is formed of microglass and/or synthetic fibers and includes a first active material for filtering water, oil, or both from the airflow. The second layer is connected to the first layer in a downstream position of the airflow, and the second layer includes a porous high molecular weight polyethylene (HMWPE). The third layer, which is downstream of the second layer, is formed of polyethylene spun bond or polyethylene air laid, bi-component spun bond or bi-component air laid, or a combination thereof. The third layer is pleatable, embossable, or both. Optionally, the filtration media may include a hot melt adhesive separator, an embossed separator, and/or a pleat lock to maintain spacing between consecutive adjacent pleats. There may also be included a mesh tube for supporting the tube shape of the multi-layer media, the mesh tube being coaxial with the multi-layer media.

DETAILED DESCRIPTION

Figure 1:
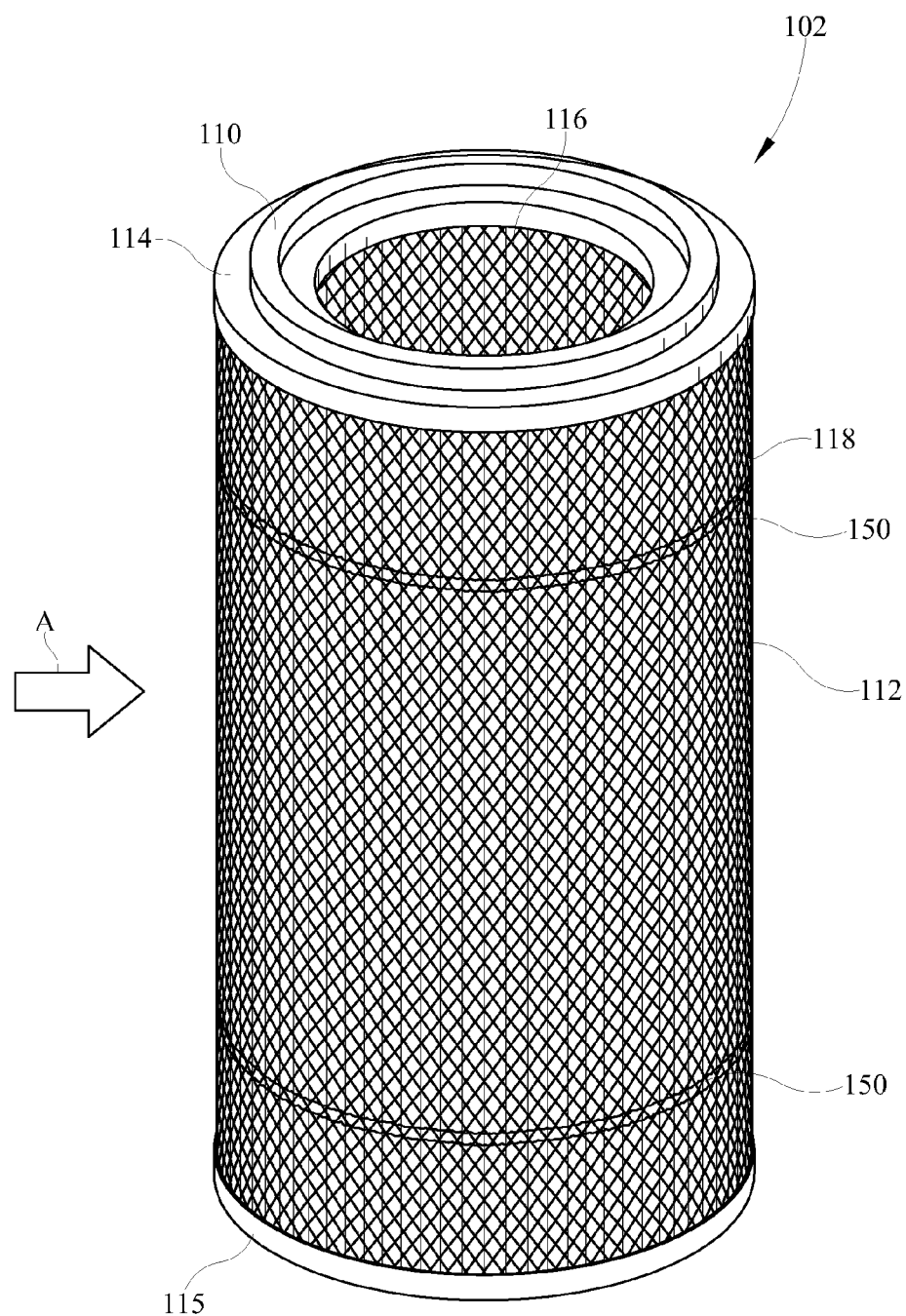
FIG. 1 is a perspective view of an embodiment of an integral canister filter and prefilter.

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections and couplings. In addition, the terms "connected" and "coupled" and variations thereof are not restricted to physical or mechanical connections or couplings.

Figure 2:
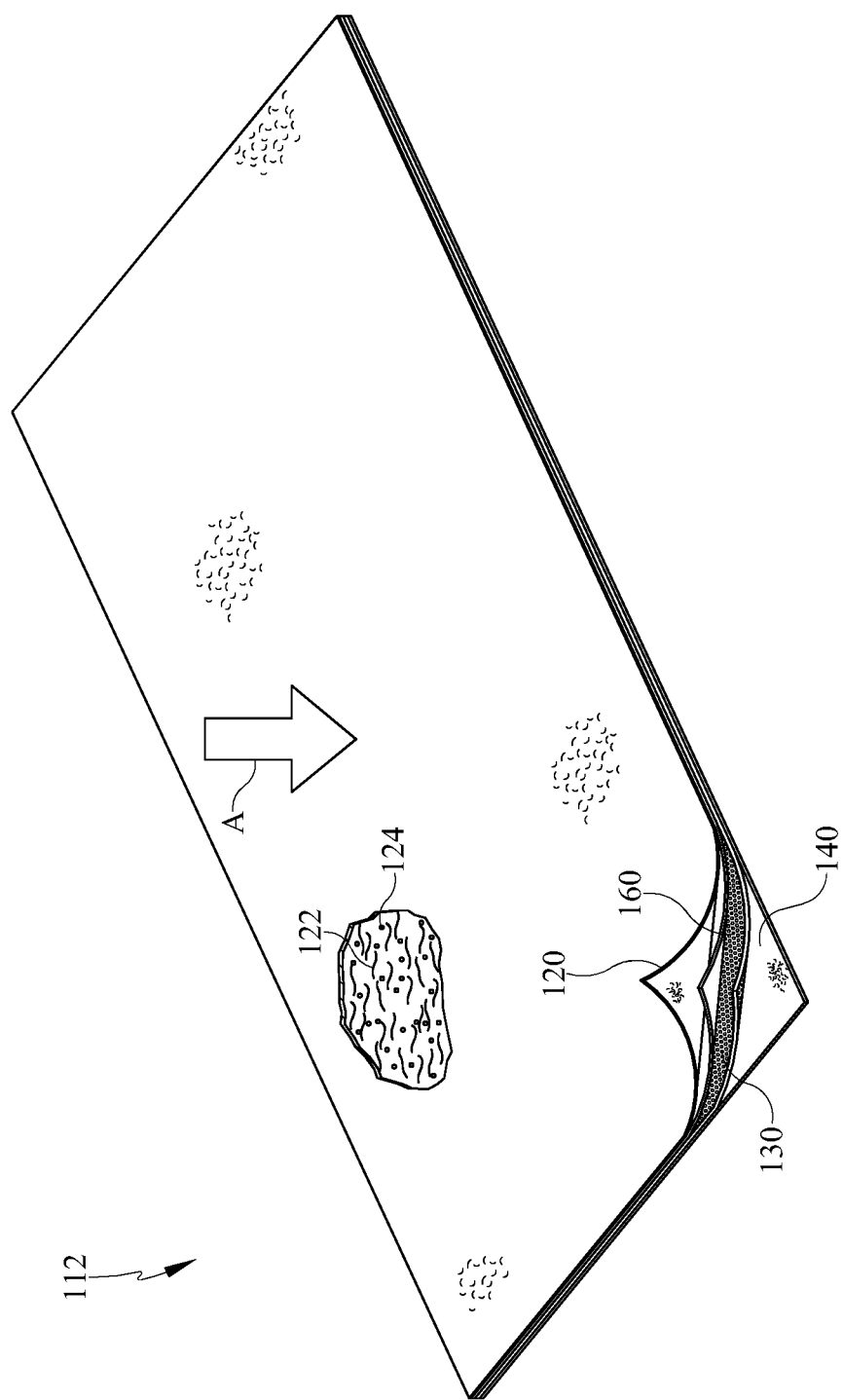
FIG. 2 is a perspective view of an embodiment of media used to form an integral canister filter and prefilter.

Referring initially to FIGS. 1 and 2, an embodiment of a canister filter 102 is depicted having a canister 110 and a filter media 112 wrapped circumferentially about canister 110. Filter media 112 may be disposed across an inner screen 116 and/or an outer screen 118 of canister 110 so that an air flow A may pass through, and/or be filtered by, canister filter 102. The canister filter 102 may have, but is not limited to, a rated air flow of about 400-1200 cubic feet per minute (CFM). Filter media 112 may be interposed between inner screen 116 and outer screen 118, although it is understood that inner screen 116 and outer screen 118 may be optional. Filter media 112 may include multiple layers, which may include any or all of a first, or prefiltration, layer 120; a second, or membrane filtration, layer 130; a third, or support, layer 140; and/or an adhesion layer 160. Filter media 112 may extend about the circumference of canister 110, as depicted in FIG. 1. Canister 110 may be a structure having, for example, a top end cap 114, a bottom end cap 115, and/or screens 116, 118 suitable for supporting filter media 112. Inner screen 116 and/or outer screen 118, if included, may be disposed across an inner circumference of filter media 112, across an outer circumference of filter media 112, or both, and may serve to structurally support filter media 112 in a tube-like configuration. It is understood that support tubes may be mesh or other structurally supportive structure that is sufficiently open to allow airflow therethrough. It is further understood that the support tubes and/or the filter media 112 may be substantially cylindrical, as shown, or may be any of a variety of other shapes, including, but not limited to: tubes having polygonal, oval, or rounded cross-sections; or spherical or rounded; any other shape; or any combination thereof. Any or all of the first layer 120, second layer 130, and third layer 140 may have particulate retention characteristics to capture and retain particulates that may encounter filter media 112. Any or all of the layers 120, 130, 140 may have oil, water, salt, and/or other chemical filtering characteristics to prevent such materials from passing through filter media 112. In some embodiments, first layer 120 may have such characteristics to protect a downstream component, such as, for example, second layer 130 and/or third layer 140.

The first layer 120 may include a fluid repellant or absorbent material in order to inhibit fluid ingress such as by, for example, marine moistures, which may cause premature decrease in permeability or increase in pressure drop across the filter media and/or prematurely reduce the service life of filter media 112. As depicted in FIG. 2, the first layer 120 may be formed of microglass fibers 122 and fiber binders 124. In some embodiments, fibers 122 may be substantially microglass fibers and/or synthetic fibers. Microglass fibers may be good for high humidity or water laden applications, and/or may help prolong the life of first layer 120 and/or filter media 112. The fibers 122 and/or the fiber binders 124 may be formed of or treated with a surface active material rendering the first layer 120 hydrophobic and/or oleophobic, which may allow the first layer 120 to repel water, salt water, and/or hydrocarbon (oil) contaminants. The hydrophobic and oleophobic surface active materials may be any of a variety of materials. In some embodiments, activated carbon, fluorochemicals, and/or fluoropolymers may be used. A C6 chemistry fluoropolymer or fluorocarbon may be used. Examples of materials that may be used include, but are not limited to, those marketed as "Unidyne" by Daikin Industries, Ltd. Specific examples of materials marketed by Daikin Industries include, but are not limited to, TG-580 and TG-581 for hydrophobic and/or water filtering characteristics and/or TG-993 for oleophobic and/or oil filtering characteristics. It is understood that these are merely specific examples and should not be considered limiting. Any of a variety of materials may be used to achieve water and/or oil filtering characteristics, which may be hydrophobic, hydrophilic, oleophobic, oleophilic, or any combination thereof. The ability to repel water, salt water, and/or hydrocarbon contaminants may improve long term efficiency by inhibiting pressure drop across filter media 112 when used in marine or other environments.

In some embodiments, the first layer 120 may have a thickness in the range of about 10 to about 1000 micrometers ($\mu$). In some embodiments, the thickness may be about 300 $\mu$m. First layer 120 may have an efficiency that will protect second layer 130 from relatively large particulate and moisture droplets that may otherwise adversely affect the life of the second layer 130 and/or filter media 112. Alternatively, in some embodiments any or all of first layer 120, second layer 130, and third layer 140 may be porous in addition to or in lieu of being formed substantially of microglass fibers and/or binders. In these alternative embodiments, any or all porous layers may inherently have water and/or oil filtering characteristics, and/or may be treated with materials to give them water and/or oil filtering characteristics.

In FIG. 2, the filter media 112 is shown in a perspective view with the constituent layers 120, 130, 140, 160 partially separated at one corner of filter media 112, any or all of which layers 120, 130, 140, 160 may be included. The first layer 120 may be positioned upstream of the second and third layers 130, 140 in an airflow direction A. The layers 120, 130, 140, 160, or any combination thereof, may be stacked or otherwise form a multi-layer media or composite such that an air flow in airflow direction A passes through each of the layers 120, 130, 140, 160. The first layer 120 may prefilter air prior to it reaching the second and/or third layers 130, 140. The first layer 120 may be connected or coupled to the second and/or third layers 130, 140 by an adhesion layer 160, for example, through use of bondable materials and/or any of a variety of connecting, attaching, adhering, and/or bonding mechanisms or methods. Adhesive layer 160 may be adjacent the first layer 120 and/or may be formed of various materials including, but not limited to, hot melt glue or spray adhesive, either or both of which may be applied in a pattern. Adhesive layer 160 may be used to substantially bond the first layer 120 to the second layer 130. It is understood that adhesives or one or more adhesive layers may be used to join any or all layers present in an embodiment. It is further understood that adhesives are optional and any of a variety of methods of attaching the layers together may be used instead of, or in addition to, using adhesives or one or more adhesive layers, such as, for example, stitching the layers together, intertangling portions of adjacent layers, laminating the layers, and or any of a variety of attachment methods or a combination thereof.

The second layer 130 may be a particulate filtration layer capable of depth and/or face loading of particulates. In some embodiments, the second layer 130 may be a porous membrane formed of, for example, high molecular weight polyethylene (HMWPE) and/or expanded polytetrafluoroethylene (ePTFE). HMWPE is often used for canister type products, for example, the type typically used with gas turbine air intake filtration. HMWPE may provide comparable filtration properties to ePTFE, although HMWPE may have a thicker construction allowing a combination of depth and face filtration or loading, which may be desirable for filtering particulate matter. The second layer 130 may have a thickness ranging from about 10 μm to about 400 μm, which may allow a degree of depth loading to alleviate face loading that may cause a decrease in operating life. In some embodiments, the thickness of the second layer 130 may desirably be about 30 micrometers or alternatively about 150 μm. Dual loading of the face and depth of the second layer (or any other layer) may limit premature increase in pressure drop thereacross, and thus may limit an associated decrease in filter life. It is understood, however, that a combination of depth loading and face loading may not be required in second layer 130. In some embodiments, the average size of the pores may be at least about 0.5 μm. In some embodiments, the pore size may be determined by the mean flow diameter measured with known air flow techniques that are understood by those of ordinary skill in the art. Average pore size of at least about 1-2 μm has been determined to be advantageous in some applications to realize a relatively low pressure drop. However, in some embodiments, the average pore size may be about 10-15 μm.

The first and/or second layers 120, 130 may be made of any of a variety of materials, including, but not limited to, polyethylene, co-polymers, and/or other components, or any combination thereof. Either or both of first and second layers 120, 130 may include electrical conducting materials, flame retardants, fillers, anti-odor additives, and/or anti-fouling additives, and/or any of a variety of other materials. In some embodiments, second layer 130 may include these or other components in addition to a membrane. These components, if included, may comprise less than about 10-20% by weight of the filter media 112, and/or may be added prior to or after extrusion, molding, and/or formation of the filter media 112. These components may be mixed with solvents for use in manufacture, although it may be desirable that these components not dramatically affect pore size, homogeneity, processability, and/or extractability of the solvent, and/or any of a variety of characteristics.

In some embodiments, second layer 130 may comprise at least 50-80% by weight polyethylene. If included, the polyethylene may have a high molecular weight (HMWPE), which may increase the strength of the second layer 130. HMWPE may be a polyethylene with an average molecular weight in the range of about 100,000-500,000 g/mole. The lower limit of the molecular weight may correspond to the rate at which substantial strength increase may be realized by stretching. The upper limit of the molecular weight may correspond to a transition to ultra-high molecular weight polyethylene. In some embodiments, a porous polyethylene film may be included in second layer 130 having at least about 5-20% by weight of the porous polyethylene film being HMWPE. In some embodiments, about 30% or more by weight of the porous polyethylene film, if included, may be HMWPE. It should be noted, however, that the amount of HMWPE may affect processability of the second layer 130 or filter media 112. Processability, in turn, may allow for, among other things, fine tuning filter media 112 or any portion thereof. The amount of HMWPE may also affect, for example, pore size. In some embodiments, the amount of HMWPE in the membrane or second layer 130 may be less than about 50-80% by weight of the membrane or second layer 130. It is understood that, if a membrane and/or film, such as a porous polyethylene film is included, it may be located outside of second layer 130 instead of or in addition to being located substantially in second layer 130.

Third layer 140 may be located adjacent the second layer 130 and may provide, for example, structural support for the second layer 130, first layer 120, adhesion layer 160, and/or any or all of filter media 112. Third layer 140 may be formed of various materials including, but not limited to polyolefin materials such as, for example, polyester, polypropylene, or polyethylene, and/or may be spun bond or air laid, and/or may be bi-component or any of a variety of mono-component materials, and/or any of a variety of other materials, or any combination thereof. Third layer 140 and/or second layer 130 may be treated with a surface active material rendering them hydrophobic and/or oleophobic, which may allow them to repel water, salt water, and/or hydrocarbon contaminants. The hydrophobic and oleophobic surface active materials may be any of a variety of materials. In some embodiments, activated carbon, fluorochemicals, and/or fluoropolymers may be used. Examples of materials that may be used include, but are not limited to, those marketed as "Unidyne" by Daikin Industries, Ltd. Specific examples of materials marketed by Daikin Industries include, but are not limited to, TG-580 and TG-581 for hydrophobic and/or water filtering characteristics and/or TG-993 for oleophobic and/or oil filtering characteristics. It is understood that these are merely specific examples and should not be considered limiting. Any of a variety of materials may be used to achieve water and/or oil filtering characteristics, which may be hydrophobic, hydrophilic, oleophobic, oleophilic, or any combination thereof.

Pressure loss over the second and/or third layers 130, 140 may depend on the pore size of the second layer 130, especially if second layer 130 includes a membrane or similar material. In some embodiments, it has been found to be advantageous to have at least about 3 millimeters $H_2O$ when the air is flowing at a velocity of 5.3 cm per second, according to defined standards. This pressure differential across all or a portion of second layer 130 at the specified velocity may ensure higher collection efficiency. More specifically, in some embodiments, the pressure loss may be at least about 4 mm $H_2O$ when the air is flowing through the membrane at 5.3 cm per second. It should be noted, however, that in some embodiments pressure loss across filter media 112 and/or second layer 130 should be limited to less than 30 mm $H_2O$ at a velocity of 5.3 cm per second, because higher pressure loss may generally require higher working pressures and/or mechanical requirements of an associated media and/or membrane.

Figure 3:
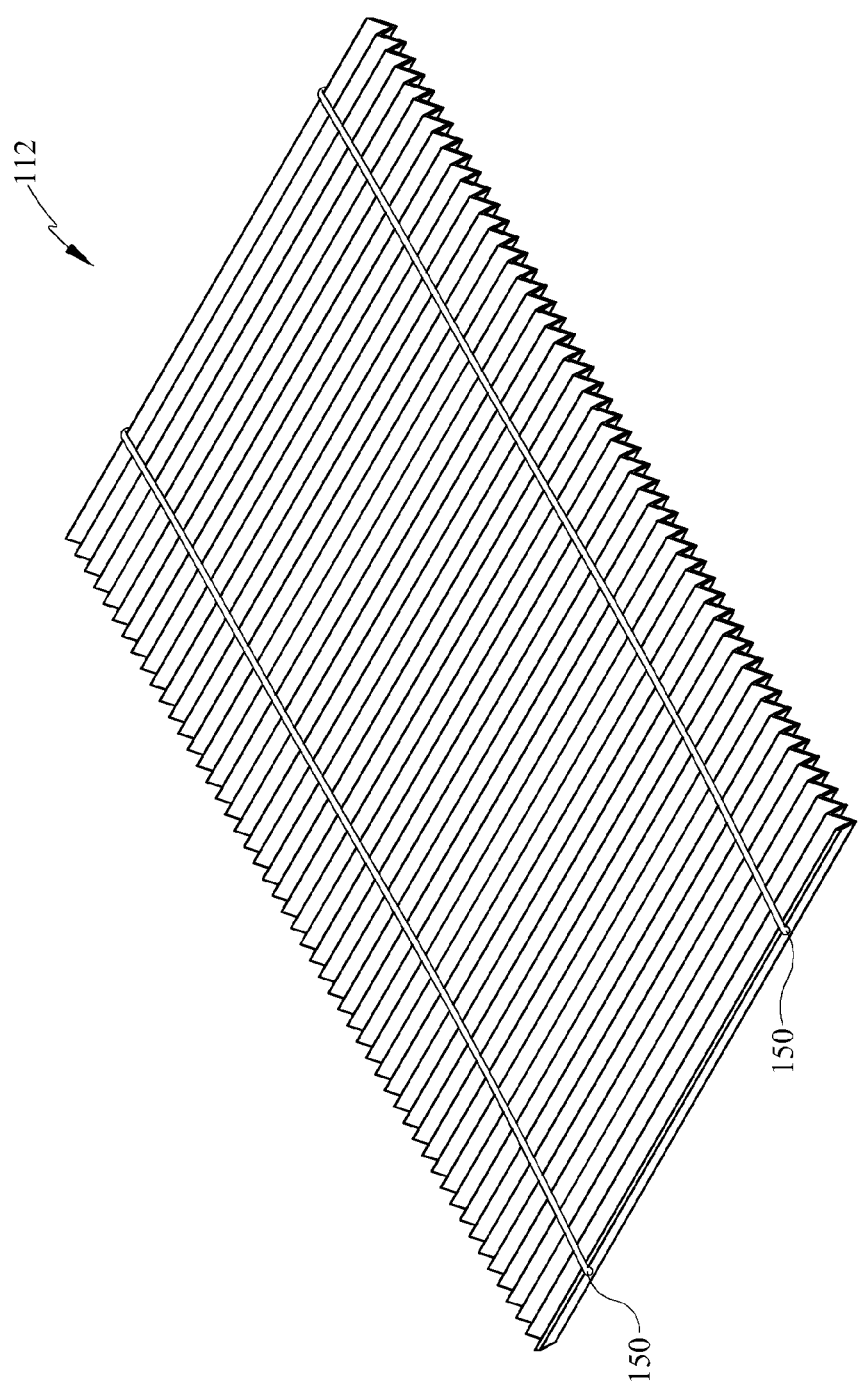
FIG. 3 is a perspective view of an embodiment of the media of FIG. 2 after pleating.

Referring now to FIG. 3, third layer 140 may have sufficient strength and heat setting characteristics to support the second layer 130 and/or be pleatable by, for example, conventional "V" pleating techniques, or any of a variety of other pleating techniques. In addition to or instead of being pleatable, third layer 140 may be capable of being embossed. Third layer 140 may have a thickness in the range of about 10 to 1000 μm, and may, in some embodiments, be about 300 μm. In some embodiments, third layer 140 may be a substantially open structure so as not to overly limit airflow and/or cause excessive pressure drop. Third layer 140 may be attached, connected, and/or coupled to second layer 130 in any of a variety of ways, including, but not limited to, by spray adhesive, heat lamination, or any of a variety of other methods or a combination thereof. In some embodiments, the three layers 120, 130, 140 may be pleated as a single sheet, thus minimizing the pleating processes required to pleat filter media 112. Adhesive layer 160 may also be included with the three layers 120, 130, 140 during pleating. It is understood that if pleating occurs, it may occur with any or all of the layers 120, 130, 140, 160 or any combination thereof.

Filter media 112 may include strips 150, which may inhibit collapse of filter media 112 and/or any component thereof under any of a variety of circumstances, for example, at a predetermined operating pressure. Strips 150 may be substantially formed of and/or include any of a variety of materials, including, but not limited to, hot melt separators, embossed separators, pleat locks, or any other material to maintain spacing between consecutive adjacent pleats. Further, strips 150 may be substantially continuous or interrupted. In some embodiments, embossments may be formed in the pleated surfaces, instead of or in addition to strips 150, in order to inhibit collapse of pleat surfaces and/or filter media 112 or any component thereof. Filter media 112 may take any of a variety of shapes and configurations, including, but not limited to tubes and/or sheets, and may be pleated and/or spiral wound, or any other shape or configuration, or any combination thereof. For example, the filter media 112 may be cylindrically shaped and pleated for use with canister 110 as shown in FIGS. 1 and 3.

In some embodiments, manufacturing costs may be reduced by manufacturing any or all layers 120, 130, 140 independently of any or all other layers 120, 130, 140. For example, it may be expensive to manufacture second layer 130 together with either or both of first layer 120 and third layer 140 because manufacturing a membrane with another layer can be costly. Thus, any or all of first layer 120, second layer 130, and third layer 140 may be formed independently and then subsequently combined with one or more of the other layers 120, 130, 140. In some embodiments that include a third layer 140 for support, third layer 140 may be laminated, glued, adhered, or otherwise attached to the inner screen 116 of the canister 110. Optionally, first layer 120 may be laminated, glued, adhered, or otherwise attached to the outer screen 118 of the canister 110. It is understood that filter media 112, or any portion thereof, may be attached to either or both screen 116, 188, if included, in any of a variety of ways, and is not limited to third layer 140 being attached to inner screen 116 and/or first layer 120 being attached to outer screen 118. Top end cap 114 and/or bottom end cap 115 may fit over filter media 112, inner screen 116 and/or outer screen 118 and may be affixed to any or all of filter media 112, inner screen 116, and outer screen 118 in any of a variety of ways. For example, top end cap 114 and/or bottom end cap 115 may be attached to inner screen 116, outer screen 118, and/or filter media 112 with epoxy resin, glue, laminate, or any of a variety of adhesives, and/or with a mechanical attachment mechanism such as one or more bolts, nails, screws, latches, snaps, zippers, or any other mechanical attachment mechanism or a combination thereof. It is also understood that the attachment mechanism is not limited to chemical or mechanical attachment, and may include, for example, magnets, electrical components, or any of a variety of other attachment mechanisms.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. An integral filter, comprising:
   a multilayer media having at least two layers, said multilayer media positionable in an air flow, said air flow able to pass through said at least two layers;
   a pre-filtration first layer forming an in-flow surface of said multilayer media, wherein said first layer is formed of microglass fibers, and said first layer includes a first material that is hydrophobic, wherein said first material is a binder for binding said microglass fibers, and wherein said first layer is hydrophobic;
   a porous membrane filtration second layer formed of an expanded second material, said second layer downstream of said first layer in said air flow.

2. The integral filter of claim 1 further comprising an adhesive layer attaching said first layer to said second layer.

3. The integral filter of claim 2, said adhesive layer further comprising at least one of hot melt glue and spray adhesive.

4. The integral filter of claim 1 wherein said microglass fibers have a basis weight in the range of about 25 to 105 grams per square meter.

5. The integral filter of claim 4 wherein said microglass fibers of said prefilter have a basis weight of approximately 65 grams per square meter.

6. The integral filter of claim 1, said first material being a fluorochemical.

7. The integral filter of claim 1, said first layer having an efficiency for removing normal atmospheric solid aerosol and particulate contaminants of at least about 90%.

8. The integral filter of claim 1, said first layer having a thickness in the range of about 10 to 1000 μm.

9. The integral filter of claim 1, wherein said expanded second material of said second layer formed of polyethylene.

10. The integral filter of claim 9, wherein said polyethylene is an ultra-high molecular weight polyethylene.

11. The integral filter of claim 1, said second layer having pores with diameters in the range of about 1 to 12 μm.

12. The integral filter of claim 1, said second layer having a thickness in the range of about 10 to 400 μm.

13. The integral filter of claim 1, wherein said integral filter is a canister filter having said at least two layers of said multilayer media forming a hollow tube shape, and said multilayer media is supported by a tube structure.

14. The integral filter of claim 13, Wherein said tube structure includes two oppositely disposed, axially aligned end caps, said end caps connected by a mesh tube disposed across an interior surface of said multilayer media.

15. The integral filter of claim 14, further comprising a second mesh tube disposed across said in-flow surface of said multilayer media.

16. The integral filter of claim 1, further including a structurally supportive third layer, wherein said third layer is at least one of pleatable and embossable.

17. The integral filter of claim 16, wherein said third layer is also the other of pleatable and embossable.

18. The integral filter of claim 16, wherein said second layer is interposed between said first layer and said third layer, and said third layer is downstream of said first layer in said air flow.

19. The integral filter of claim 1, wherein said expanded second material of said second layer formed of polytetrafluoroethylene.

20. An integral filter comprising:
    a multi-layer media having at least three layers in fluid communication with each other to filter an airflow through said multi-layer media;
    a first layer forming an in-flow surface of said multi-layer media, said first layer formed of microglass fibers, said first layer including a first active material for filtering water from said airflow, wherein said first active material is a binder for binding said microglass fibers, and wherein said first layer is hydrophobic;
    a second layer connected to said first layer in a downstream position of said airflow, said second layer including a porous membrane formed of an expanded second material; and
    a third layer downstream of said second layer and formed of at least one of polyethylene spun bond, polyethylene air laid, bi-component spun bond, and bi-component air laid, said third layer at least one of pleatable and embossable.

21. The integral filter of claim 20, further comprising at least one of a hot melt adhesive separator, an embossed separator, and a pleat lock to maintain spacing between consecutive adjacent pleats.

22. The integral filter of claim 20, wherein said expanded second material is polytetrafluoroethylene.

23. The integral filter of claim 20, wherein said expanded second material is polyethylene.

24. The integral filter of claim 23, wherein said polyethylene is an ultra-high molecular weigh polyethylene.

25. The integral filter of claim 20, is a canister, wherein said multi-layer media forms a tube shape.

26. The integral filter of claim 25, further comprising a mesh tube for supporting said tube shape of said multi-layer media, said mesh tube being coaxial with said multi-layer media.

27. The integral filter of claim 20, Wherein said second layer having pores with diameters in the range of about 1 to 12 μm and a thickness in the range of about 10 to 400 μm.

* * * * *